US012593754B2

(12) United States Patent
Hoppes et al.

(10) Patent No.: US 12,593,754 B2
(45) Date of Patent: Apr. 7, 2026

(54) ROUND BALER CROP PICKUPS

(71) Applicant: Vermeer Manufacturing Company, Pella, IA (US)

(72) Inventors: Grant Hoppes, Pella, IA (US); Calvin Meinders, Pella, IA (US); Andrew Irlbeck, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 413 days.

(21) Appl. No.: 18/316,140

(22) Filed: May 11, 2023

(65) Prior Publication Data

US 2023/0363313 A1     Nov. 16, 2023

Related U.S. Application Data

(60) Provisional application No. 63/340,652, filed on May 11, 2022.

(51) Int. Cl.
| | |
|---|---|
| *A01D 89/00* | (2006.01) |
| *A01F 15/07* | (2006.01) |

(52) U.S. Cl.
CPC ......... *A01D 89/008* (2013.01); *A01D 89/002* (2013.01); *A01F 15/07* (2013.01)

(58) Field of Classification Search
CPC ...... A01D 89/002; A01D 89/008; A01F 15/07
See application file for complete search history.

(56) References Cited

U.S. PATENT DOCUMENTS

| | | | |
|---|---|---|---|
| 2,674,839 | A | 4/1954 | Russel |
| 3,055,162 | A * | 9/1962 | Mcclellan ............... A01D 41/10 56/364 |
| 3,713,283 | A | 1/1973 | Fritz |
| 4,161,859 | A | 7/1979 | Storm et al. |
| 4,297,833 | A | 11/1981 | Gaeddert |

(Continued)

FOREIGN PATENT DOCUMENTS

| | | | | |
|---|---|---|---|---|
| DE | 3621995 | A1 * | 1/1988 | ........... A01D 89/002 |
| DE | 102006061010 | A1 | 7/2008 | |

(Continued)

OTHER PUBLICATIONS

Reiter (DE_102020107031 A1)—English translation (Year: 2021).*

(Continued)

*Primary Examiner* — Adam J Behrens
*Assistant Examiner* — Julia C Tran
(74) *Attorney, Agent, or Firm* — Armstrong Teasdale LLP

(57) ABSTRACT

A round baler includes a bale formation chamber and a rotor device having a plurality of teeth, the teeth having outer tips that define a circumferential path of travel of the rotor device. The round baler also includes a crop pickup device including a plurality of pickup tines connected to a rotating pickup reel and a plurality of stripper bands, each of the plurality of pickup tines passing through a gap formed between adjacent stripper bands. The crop pickup device has an engagement zone and a release zone, wherein the release zone is adjacent to the circumferential path of travel of the rotor device such that the rotor device and the pickup reel rotate and cooperate to convey crop material from the crop pickup device towards the bale formation chamber.

17 Claims, 16 Drawing Sheets

(56) References Cited

U.S. PATENT DOCUMENTS

| | | | | |
|---|---|---|---|---|
| 4,524,576 | A | 6/1985 | Probst | |
| 5,426,928 | A | 6/1995 | Frimml et al. | |
| 6,279,304 | B1 * | 8/2001 | Anstey | A01F 15/106 |
| | | | | 56/341 |
| 6,874,311 | B2 * | 4/2005 | Lucand | A01F 15/106 |
| | | | | 56/364 |
| 6,948,300 | B1 * | 9/2005 | Bandstra | A01F 15/106 |
| | | | | 56/119 |
| 7,478,523 | B2 | 1/2009 | McClure et al. | |
| 9,426,942 | B2 | 8/2016 | Kappelman et al. | |
| 9,578,809 | B2 | 2/2017 | Reiter | |
| 10,039,237 | B2 | 8/2018 | Smith et al. | |
| 10,225,985 | B2 | 3/2019 | Cox et al. | |
| 10,238,037 | B2 | 3/2019 | Ubaldi | |
| 2013/0167501 | A1 | 7/2013 | Seeger | |
| 2021/0068345 | A1 | 3/2021 | Little et al. | |

FOREIGN PATENT DOCUMENTS

| | | | | | |
|---|---|---|---|---|---|
| DE | 202009008185 | U1 * | 10/2009 | .......... | A01D 89/002 |
| DE | 102014117740 | A1 | 6/2016 | | |
| DE | 102017108647 | A1 * | 10/2018 | .......... | A01D 89/002 |
| DE | 102020107031 | A1 * | 9/2021 | .......... | A01D 89/002 |
| EP | 1980144 | A1 | 10/2008 | | |

OTHER PUBLICATIONS

Laumann (DE 102017108647 A1)—English translation (Year: 2018).*
Sacht (DE 3621995 A1)—English translation (Year: 1988).*
Strautmann (DE 202009008185 U1)—English translation (Year: 2009).*
Krone, Krone ZX, as published in a 2006 Krone publication.

* cited by examiner

208

208

208

208

208

208

208

208

ROUND BALER CROP PICKUPS

CROSS REFERENCE TO RELATED APPLICATIONS

This application claims the benefit of priority to U.S. Provisional Patent Application No. 63/340,652, filed May 11, 2022, the contents and disclosure of which are incorporated by reference herein in their entirety. Reference is also made to U.S. Pat. No. 10,225,985, filed Jun. 15, 2016, and U.S. Patent Application Publication No. 20210068345, filed Nov. 13, 2020, which are hereby incorporated by reference in their entirety.

FIELD OF THE DISCLOSURE

The field of the disclosure relates to crop pickups of round balers and, more particularly, to stripper bands of such crop pickups.

BACKGROUND

Round balers have become an integral part of the agricultural industry and a variety of different types of balers are currently in use. In some examples, balers use a system of belts or a fixed chamber that compresses a crop material to form a bale. Round balers generally include a crop pickup device (e.g., a crop pickup) for picking crop material from the ground and feeding it into a bale formation chamber. Some known round balers have a rotor device that assists in propelling the crop material from the crop pickup to the bale formation chamber.

Conventional crop pickup devices convey the crop material from the ground into the round baler using pickup tines that rotate to grasp and convey the crop material. The pickup tines rotate through slots formed between stripper bands to remove the crop material from the pickup tines.

FIGS. 7A and 7B show a typical configuration for one type of crop pickup as may be used in the prior art, generally known as a "camless" pickup. An example crop pickup, referred to as crop pickup device 100 in FIGS. 7A and 7B showing the prior art, includes a plurality of pickup tines 102 mounted with a proximal end fixed to a pickup reel 104. The example configuration shown in FIG. 7A includes four rows of pickup tines 102. The crop pickup device 100 also includes one or more stripper bands 108 mounted in a fixed position, the stripper bands 108 having a profile that varies around an axis of rotation $A_{100}$, such that there are areas of varying profile shape such as, but not limited to, axially round and tangentially straight. The pickup tines 102 pass through gaps 109 formed between adjacent stripper bands 108, as shown in FIG. 7B.

As the pickup reel 104 rotates in a clockwise direction R (FIG. 7A), the pickup tines 102 travel around the axis of rotation $A_{100}$ such that the distal ends 103 of the pickup tines 102 define a circumferential path of travel CP. As the pickup reel 104 rotates, the pickup tines 102 move through a plurality of defined "zones" around the axis of rotation $A_{100}$, the zones being aligned with the varying profile shape areas of the stripper bands 108. For example, the pickup tines 102 engage, lift, and convey the crop as the pickup tines 102 pass between the positions indicated by "102B" and "102T" in FIG. 7A, which is referred to as the crop engagement zone, or simply "engagement zone". Position 102B is generally the position around the axis of rotation $A_{100}$ at which the pickup tines 102 begin to engage crop material for lifting and conveying the crop material from the ground toward the bale formation chamber 30, with position 102B generally being the start of the consistent outer profile radius of the stripper band 108. Position 102T is generally the position around the axis of rotation $A_{100}$ at which the outer profile of the stripper bands 108 changes.

The radial curve of the engagement zone of stripper bands 108 is generally co-axial with the axis of rotation $A_{100}$ of the crop pickup device 100 between positions 102B and 102T. As the pickup tines 102 pass clockwise through position 102B and towards position 102T (e.g., through the engagement zone), the distal end of the pickup tines 102 extends beyond the stripper bands 108 by a generally consistent engagement zone carry distance CD. The carry distance CD is generally consistent through the engagement zone due to the generally consistent radial profile of the stripper bands 108 in the engagement zone. The carry distance CD can be defined as the distance the pickup tines 102 extend beyond the perimeter of the stripper bands 108. As the pickup tines 102 rotate about the axis of rotation $A_{100}$ on the pickup reel 104, the carry distance CD may vary depending on the outer profile of the stripper bands 108. Additionally, depending on the outer profile of the stripper bands 108, a length portion of the pickup tines 102 may vary.

The pickup tines 102 continue to rotate clockwise from, for example, position 102T towards a position indicated by "102R" in FIG. 7A, which is referred to as the crop release zone, or simply the "release zone". Position 102R is generally the position around the axis of rotation $A_{100}$ at which the pickup tines 102 are fully within the profile of the stripper bands 108. The pickup tines 102 continue to rotate clockwise from position 102R back around to position 102B, which is referred to as the pass-through zone. In some embodiments, positions 102B, 102T, and/or 102R may differ from the positions shown in FIG. 7A. For example, positions 102B, 102T, and/or 102R may depend on pickup height settings, ground conditions, and/or crop positions.

The pickup tines 102 are oriented relative to the stripper bands 108 in the engagement zone by a relatively consistent carry angle. As used herein, the "carry angle" is the angle between a plane P that is tangent to the stripper band 108 at the point where the pickup tine 102 and the stripper band 108 intersect and a longitudinal axis LA of the pickup tine 102 at this intersection point. The orientation of the pickup tines 102 relative to the stripper bands 108 in the release zone changes as the pickup tines 102 rotate through the release zone. For example, as shown in FIG. 7A, the carry angle at the start of the release zone at position 102T may be the same as the carry angle in the engagement zone. As the pickup tines 102 rotate toward position 102R, the carry angle between the pickup tine 102 and the stripper bands 108 may be reduced down to a minimum carry angle at position 102R. For example, the carry angle in the engagement zone of the crop pickup device 100 known in the prior art may be about 120° and the minimum carry angle may be about 56°.

FIG. 7B shows the position of the pickup tines 102 in a side-to-side relation relative to the position of the stripper bands 108. The pickup tines 102 may be mounted to the pickup reel 104 individually or in pairs. For example, an individually mounted tine has one tine per mounting base, and a double-tine (e.g., pair tine) may have two tines per mounting base. FIG. 7B illustrates tines that are mounted in pairs, with a first tine assembly 102-1 having two tines 102-1A, 102-1B and a second tine assembly 102-2 having two tines 102-2A, 102-2B. It should be noted that the side-to-side spacing of the pickup tines 102 within gap 109 may not be consistent (e.g., the tine 102 may not be centered within gap 109). This variation is illustrated in FIG. 7B where there is a larger space between tines 102-1B and 102-2A than the space between 102-1A and 102-1B or between 102-2A and 102-2B. In both cases, the stripper bands 108 are located between the pickup tines 102 with a clearance distance to reduce the incidence of contact between the pickup tines 102 and the stripper bands 108.

The pickup tines 102 may be flexible and may deflect and contact a stripper band 108 when loaded with crop. Contact between the pickup tines 102 and the stripper bands 108 creates frictional drag, which will require additional power to rotate the pickup reel 104. If the gap 109 is too large, the crop material can be pulled within the stripper bands 108 (e.g., within an outer periphery/profile of the stripper bands 108), where the crop material can come into contact with the pickup reel 104. The crop material may have an increased tendency to be pulled within the outer periphery/profile of the stripper bands 108 in the release zone due to the pickup tines 102 passing through the outer periphery of the stripper bands 108 in the release zone. With some crop materials, such as longer crops with a relatively high tensile strength, the crop material is known to stick on the pickup tines 102 and travel past the outer periphery of the stripper bands 108, causing crop material to wrap around the pickup reel 104 in a quantity sufficient to interrupt operation of the round baler.

A need exists for a crop pickup device that reduces the amount of material pulled within the pick-up bands of the crop pickup device while reducing contact between the tines and the adjacent stripper bands.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a round baler. The round baler includes a bale formation chamber and a rotor device having a plurality of teeth connected to a rotor, the teeth having outer tips that define a circumferential path of travel of the rotor device. The round baler also includes a crop pickup device including a plurality of pickup tines connected to a rotating pickup reel and a plurality of stripper bands having an outer profile, wherein each of the plurality of pickup tines has a distal end defining a circumferential path of travel of the crop pickup device, each of the plurality of pickup tines passing through a gap formed between adjacent stripper bands. The crop pickup device has an engagement zone within which the plurality of pickup tines extend beyond the outer profile of the plurality of stripper bands by a first carry distance and at a first carry angle. The crop pickup device also has a release zone within which the plurality of stripper bands are shaped such that the pickup tines extend beyond the outer profile of the plurality of stripper bands by a second carry distance and at a second carry angle, the release zone extending from the engagement zone to a position at which each of the plurality of pickup tines pass through the outer profile of the stripper bands. The plurality of stripper bands have a first width in the engagement zone and a second width in the release zone, the second width being greater than the first width. The release zone is adjacent to the circumferential path of travel of the rotor device such that the rotor device and the pickup reel rotate and cooperate to convey crop material from the crop pickup device towards the bale formation chamber.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
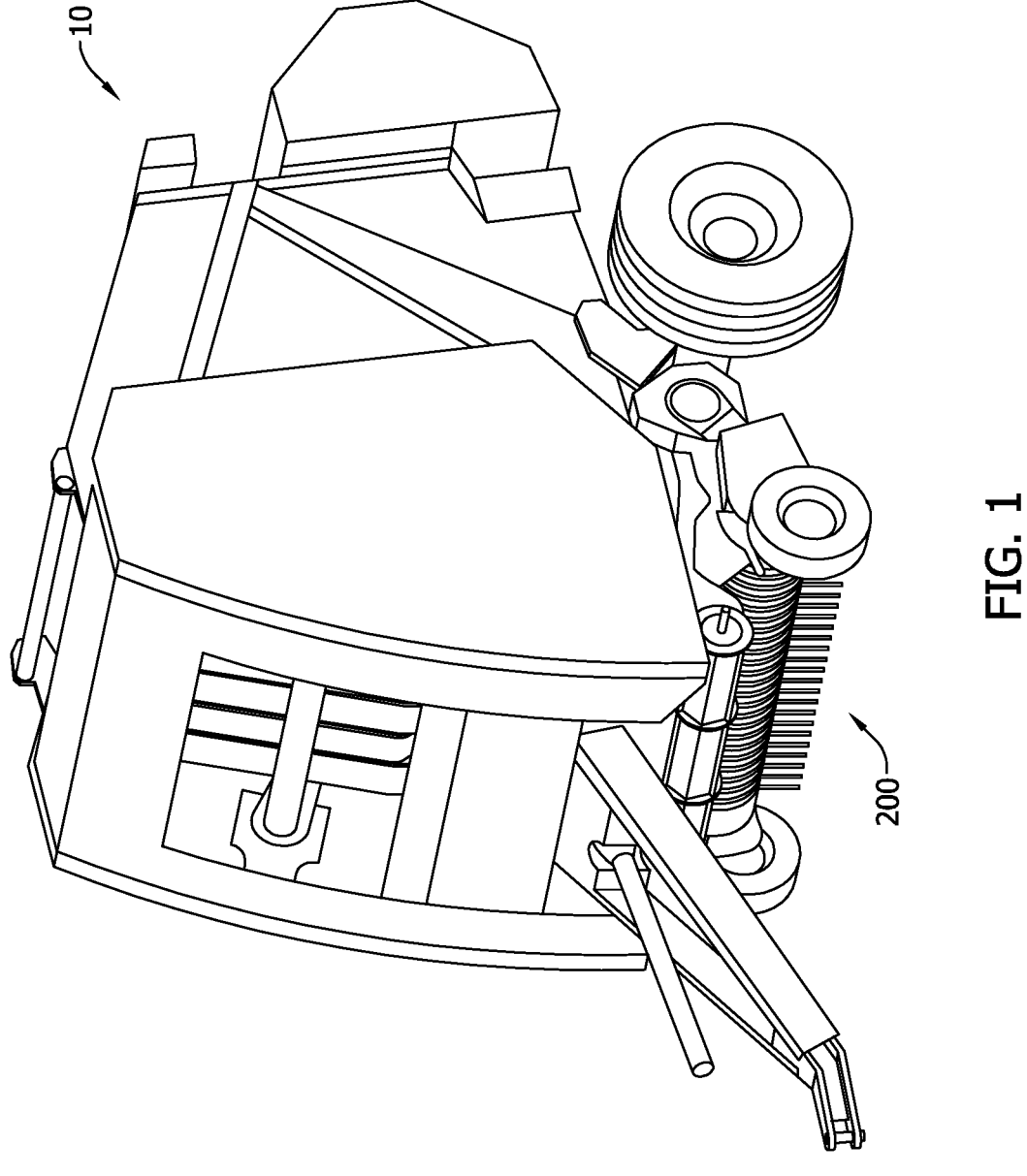
FIG. 1 is a side perspective view of a round baler.
Figure 2:
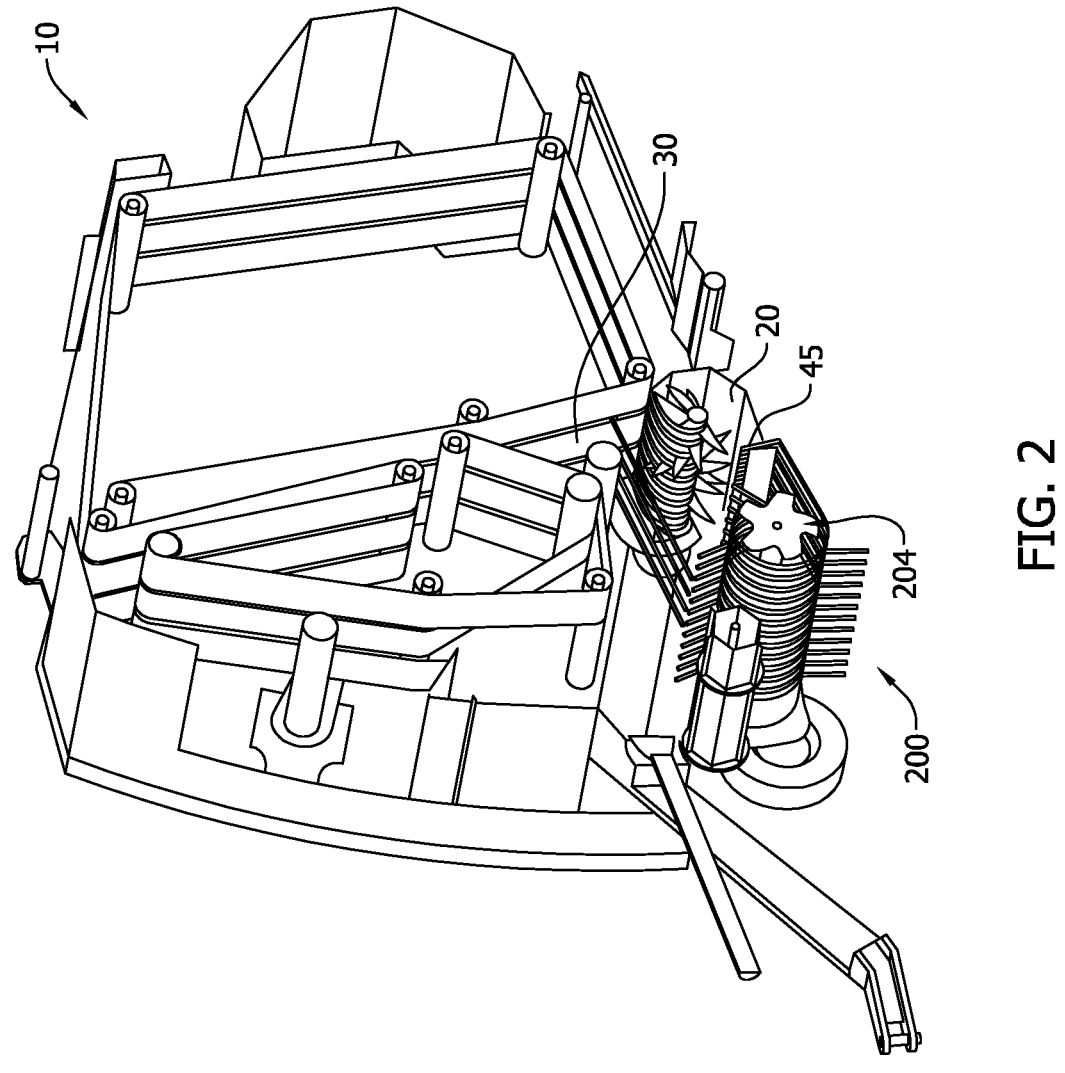
FIG. 2 is a side cross-sectional perspective view of the round baler shown in FIG. 1.

FIGS. 1 and 2 are side perspective views of a round baler 10. The round baler 10 may be towed behind a vehicle or operated as a standalone machine. The round baler 10 includes a bale formation chamber 30, a crop pickup device 200, a crop pickup frame 45, and a rotor device 20 that assists in propelling the crop material from the crop pickup device 200 to the bale formation chamber 30. The bale formation chamber 30 may include at least one bale forming belt (not shown in figures) routed around a series of rollers (not shown in figures). The crop pickup device 200 includes a pickup reel 204. As the crop material is picked up by the crop pickup device 200 and deposited in the bale formation chamber 30, the crop material may be compressed by a bale forming belt(s) to form a full bale.

Figure 3:
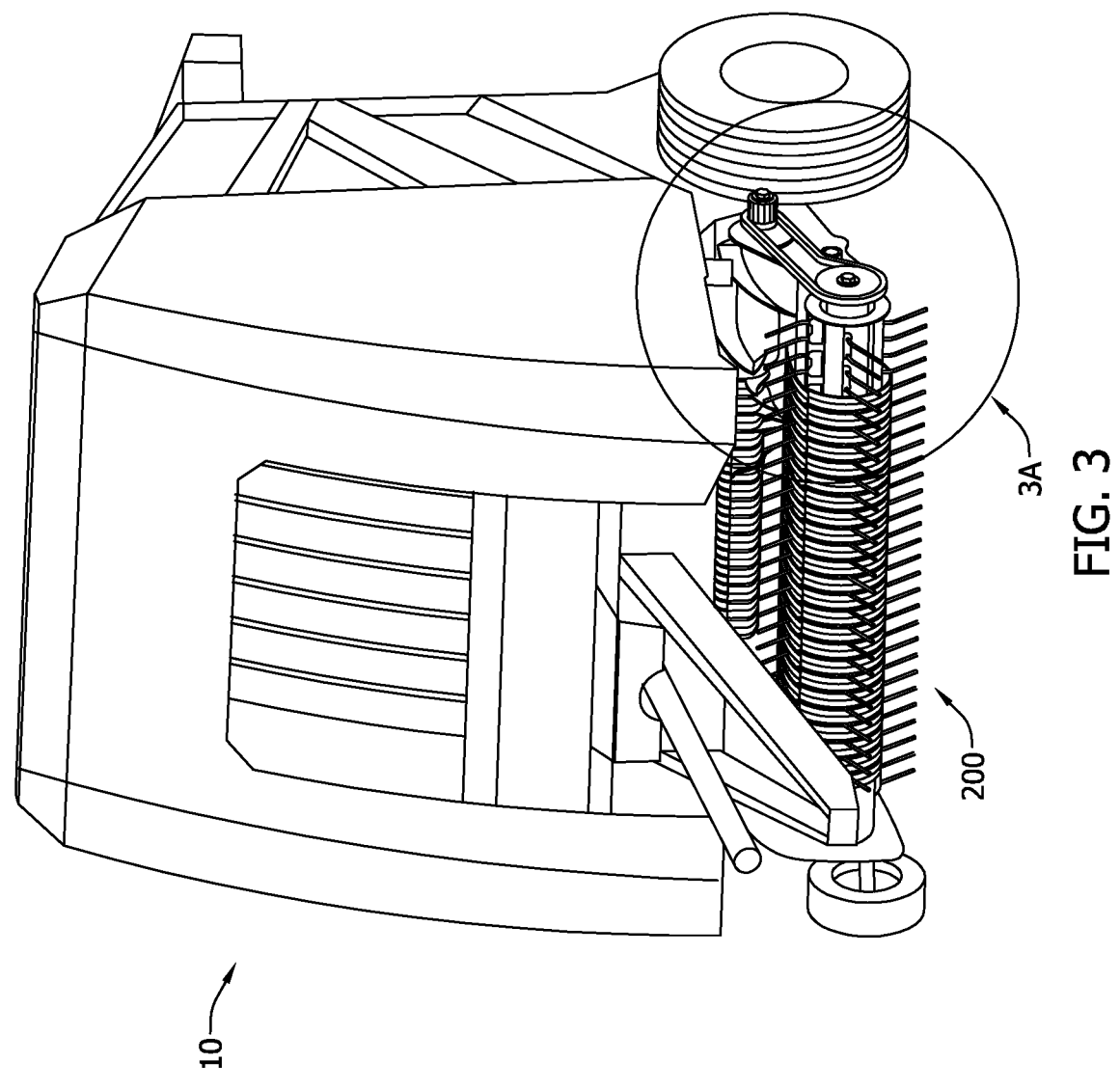
FIG. 3 is a front perspective view of the round baler shown in FIG. 1.
Figure 4:
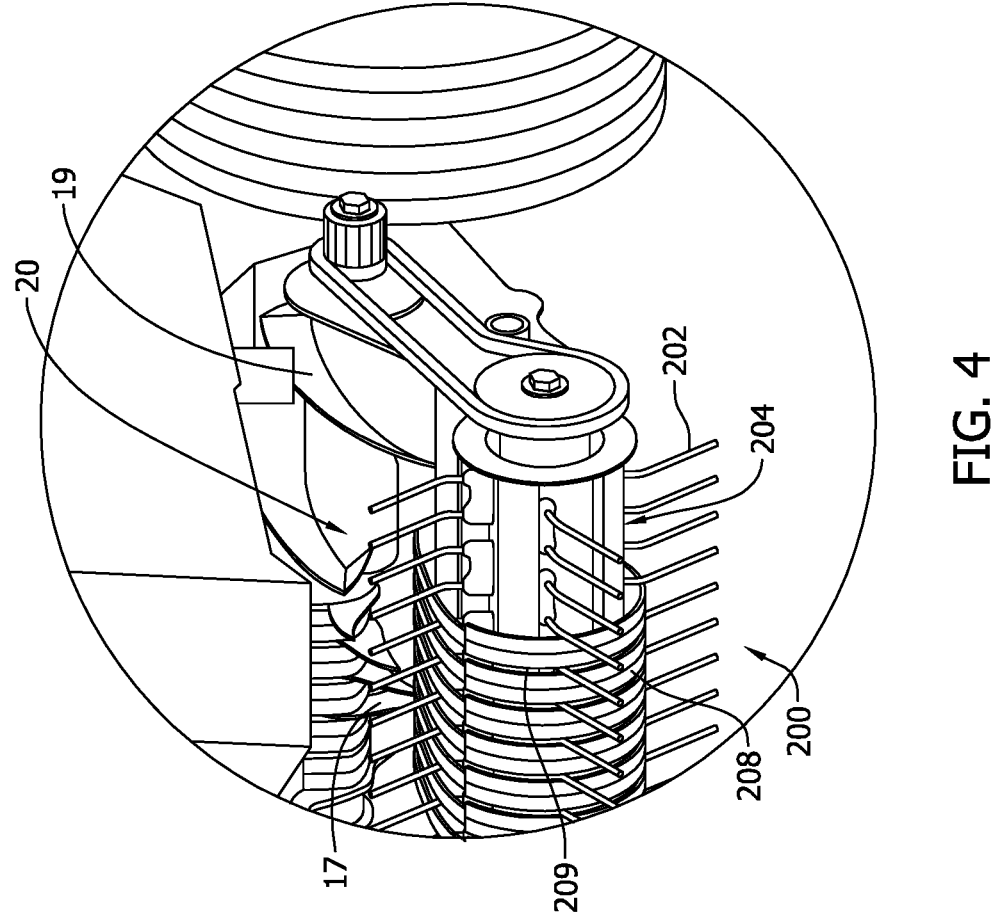
FIG. 4 is an enlarged perspective view of area 3A of the round baler shown in FIG. 3.

FIG. 3 is a front perspective view of the round baler 10. FIG. 4 is an enlarged perspective view of area 3A shown in FIG. 3. In the example embodiment, the crop pickup 200 includes stripper bands 208 and pickup tines 202, with the pickup tines 202 passing through gaps 209 formed between the adjacent stripper bands 208. The stripper bands 208 may connect to the pickup frame 45 (shown in FIG. 11), which may also be referred to as a "back-plate".

In the example embodiment, the round baler 10 includes a rotor device 20 (a detailed view of which is provided in FIG. 11) having a plurality of teeth 17 connected to an auger 19. Although the round baler 10 is shown with the rotor device 20 as an overshot rotor device between a camless pickup and the bale formation chamber 30, this a nonlimiting example and other configurations are possible. For example, the crop pickup device 200 may feed crop material directly into the bale formation chamber 30 with no intervening crop guiding components being positioned between the rear of the crop pickup device 200 and the bale formation chamber 30. Additionally, for example, the round baler 10 may have a roller above (e.g., a start roller) and/or below (e.g., a drum roller) a crop flow path between the rear of the crop pickup device 200 and the bale formation chamber 30. Further, for example, the round baler 10 may have the rotor device 20 positioned above (e.g., an undershot rotor) and/or below (e.g., an overshot rotor) the crop flow path between the rear of the crop pickup device 10 and the bale formation chamber 30. Furthermore, a cam style pickup assembly could be utilized in place of a camless type of pickup assembly.

Figure 5:
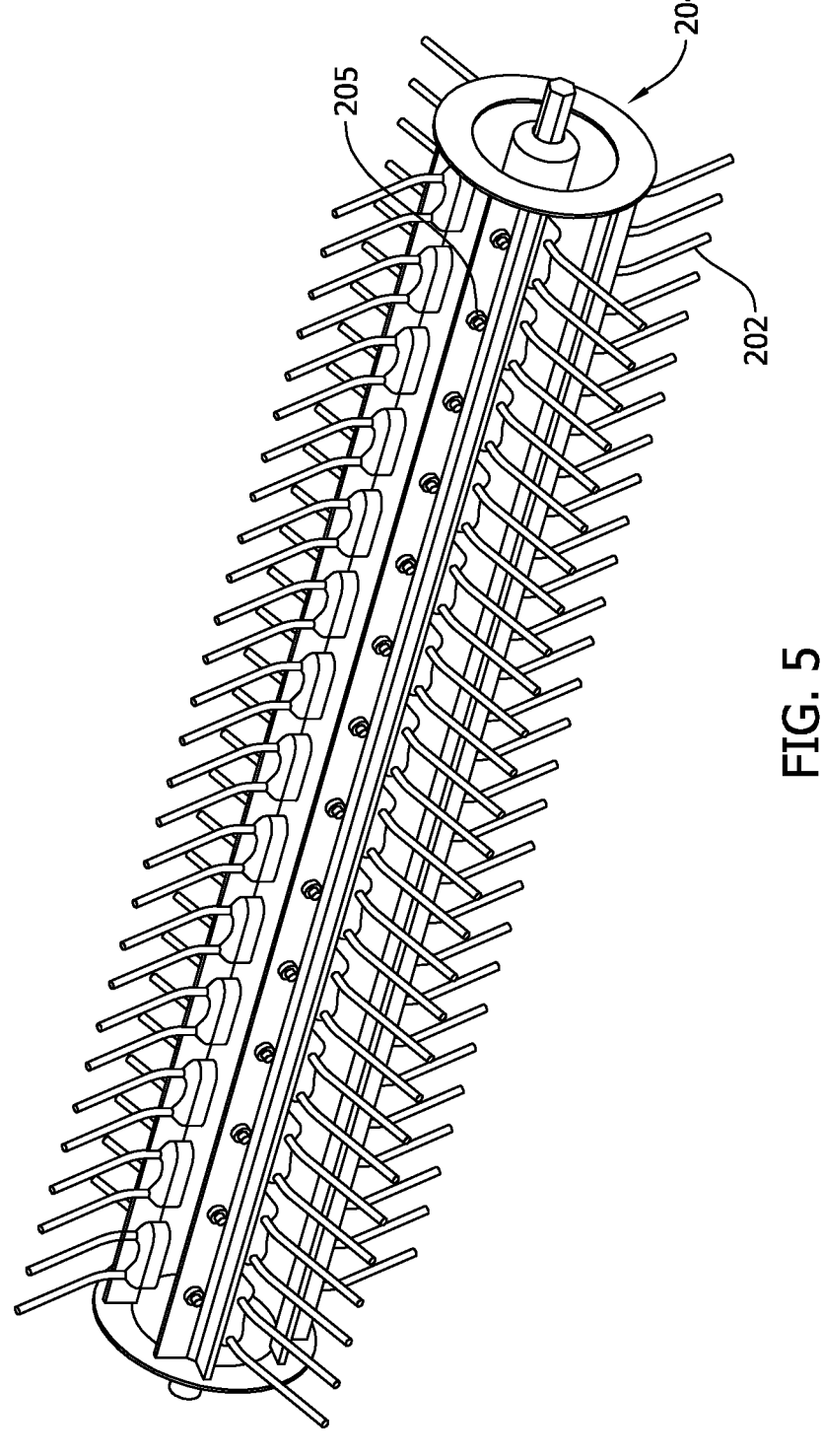
FIG. 5 is a perspective view of a pickup reel for use with the round baler shown in FIG. 1.

FIG. 5 is a perspective view of the pickup reel 204 for use with the crop pickup device 200 of the round baler 10. The pickup tines 202 are mounted by a fastener 205 to the pickup reel 204, with a proximal end of the pickup tines 202 being secured to the pickup reel 204. In the example embodiment, the pickup tines 202 are mounted as double-tines (e.g., tine pairs). In some embodiments, the pickup tines 202 may be mounted individually (e.g., as single tines).

Figure 6:
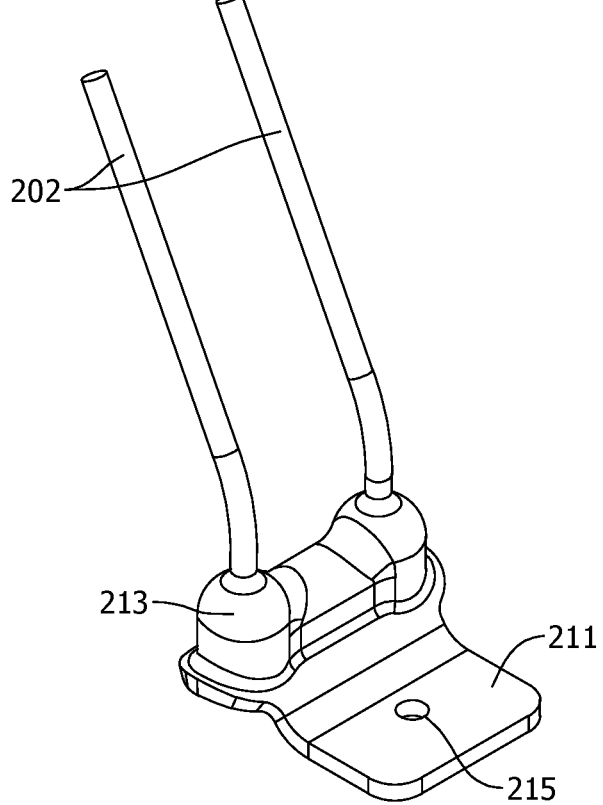
FIG. 6 is a perspective view of a double-tine for use with the pickup reel shown in FIG. 5.
Figure 7A:
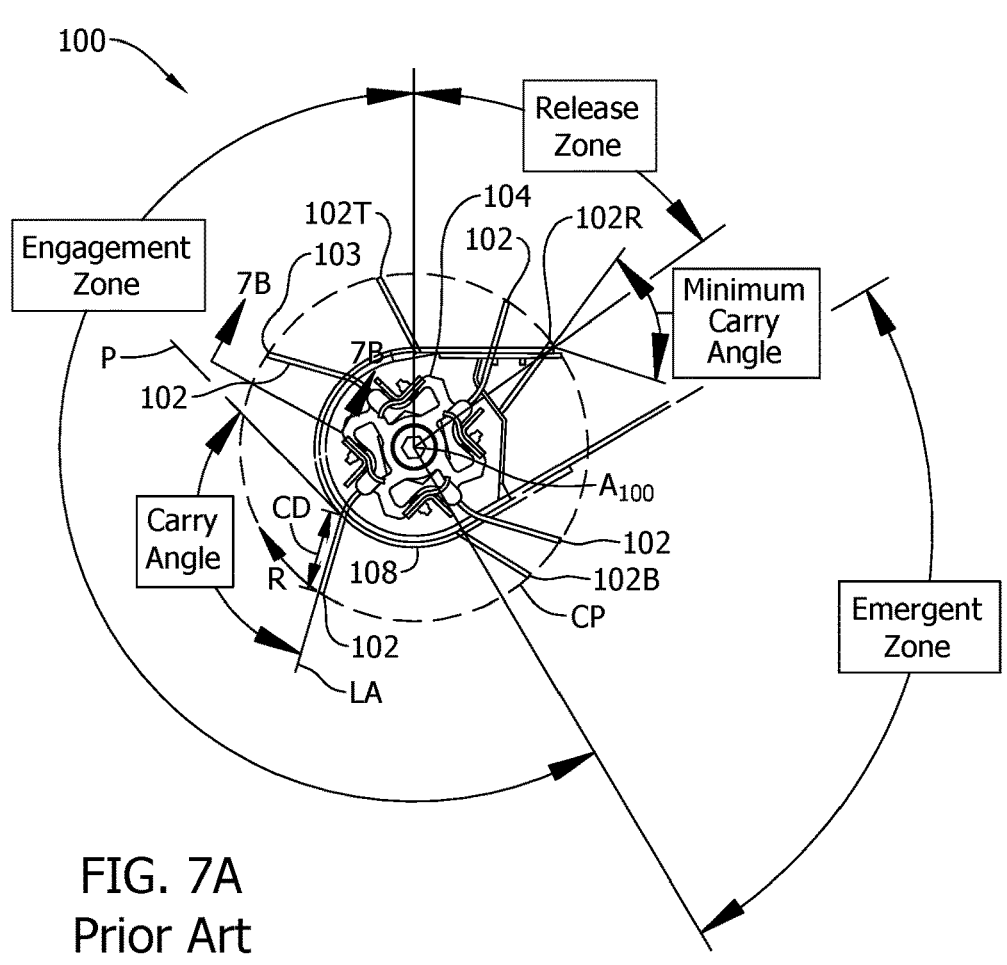
FIG. 7A is a side view of a crop pickup device of a conventional round baler.
Figure 7B:
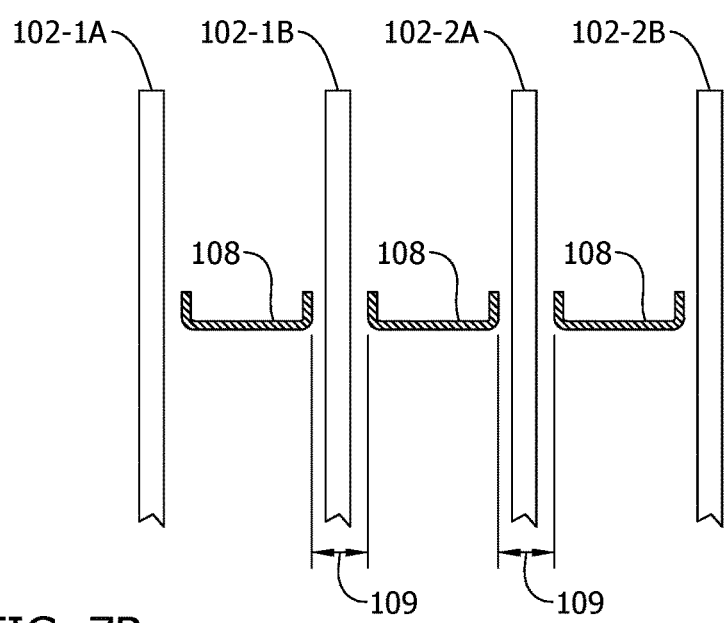
FIG. 7B is a cross-sectional view of the tines and the stripper bands of the conventional round baler taken along line 7B-7B in FIG. 7A.

FIG. 6 is a perspective view of a double-tine configuration of the pickup tines 202. The double-tine configuration shown in FIG. 6 includes a base 213 coupled to each of the two pickup tines 202 in the tine pair and a mount 211 connected to the base 213. The mount 211 includes a mounting aperture 215, which may receive fastener 205 to secure the mount 211 of the double-tine to the pickup reel 204.

Figure 8A:
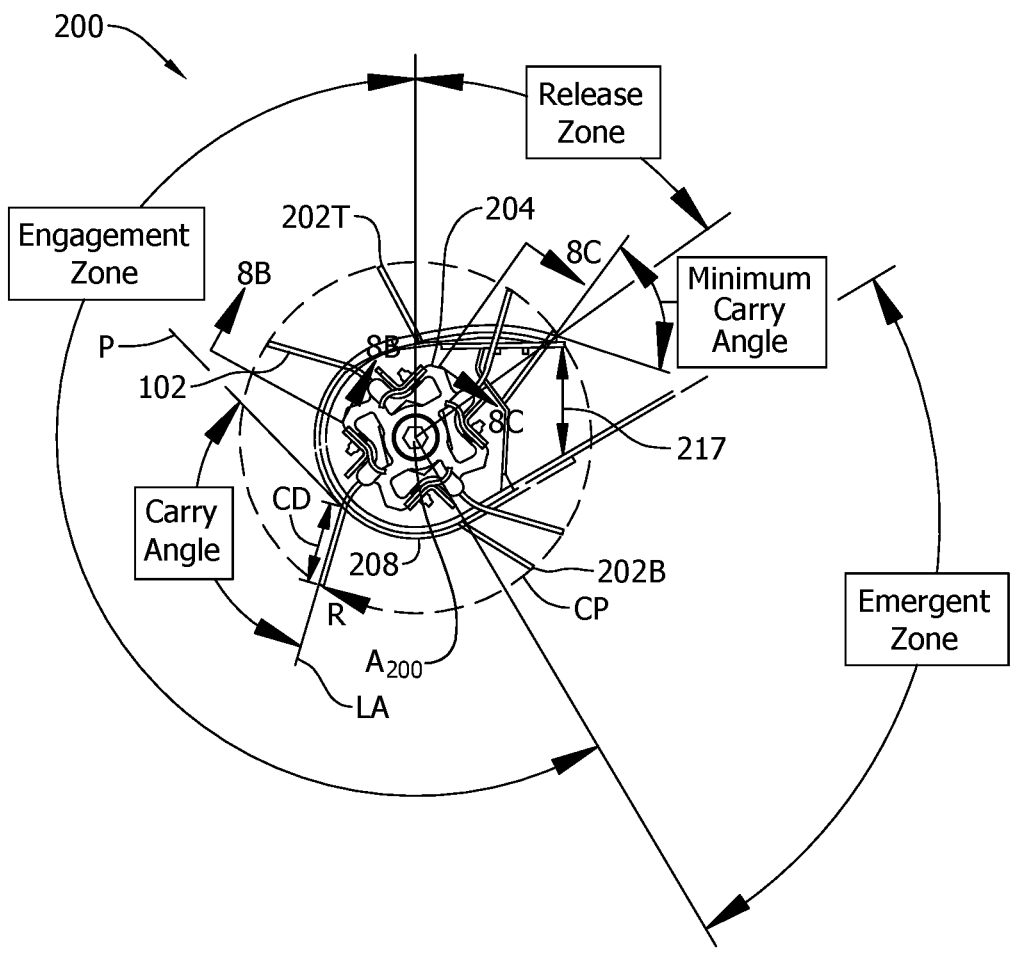
FIG. 8A is a side view of a crop pickup device of the round baler of an embodiment of the present disclosure.
Figure 8B:
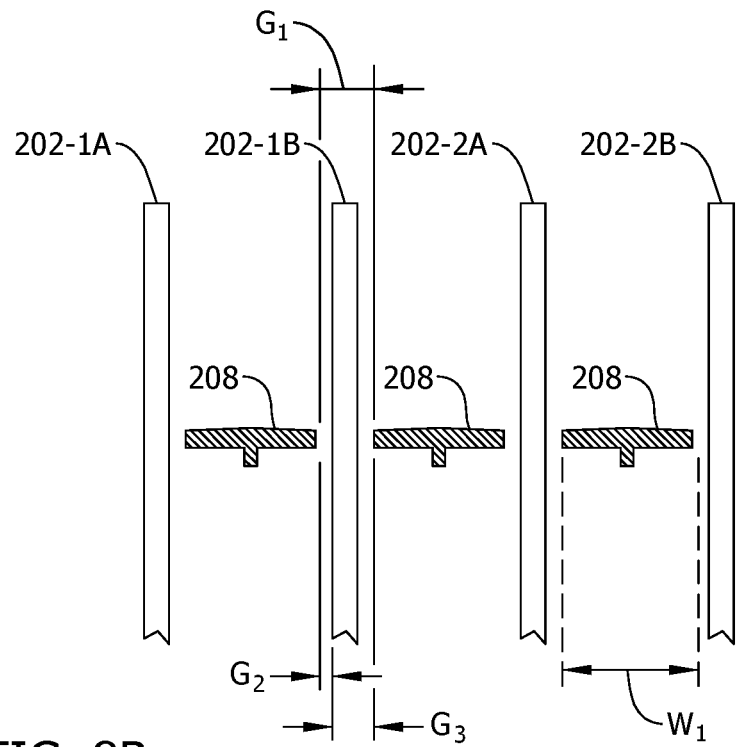
FIG. 8B is a cross-sectional view of the tines and the stripper bands of the crop pickup device taken along line 8B-8B in FIG. 8A.
Figure 8C:
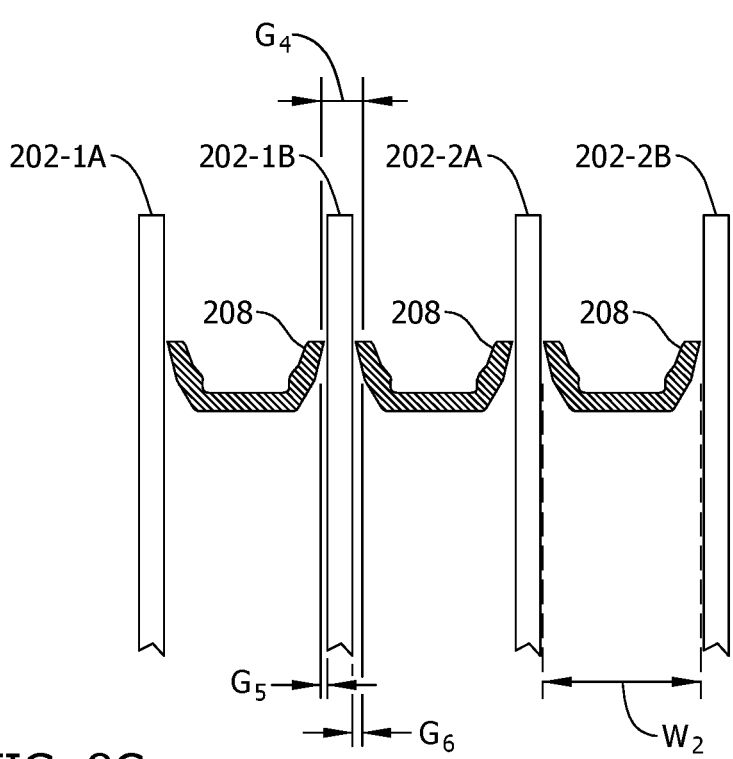
FIG. 8C is a cross-sectional view of an embodiment of the tines and the stripper bands of the crop pickup device taken along line 8C-8C in FIG. 8A.
Figure 9:
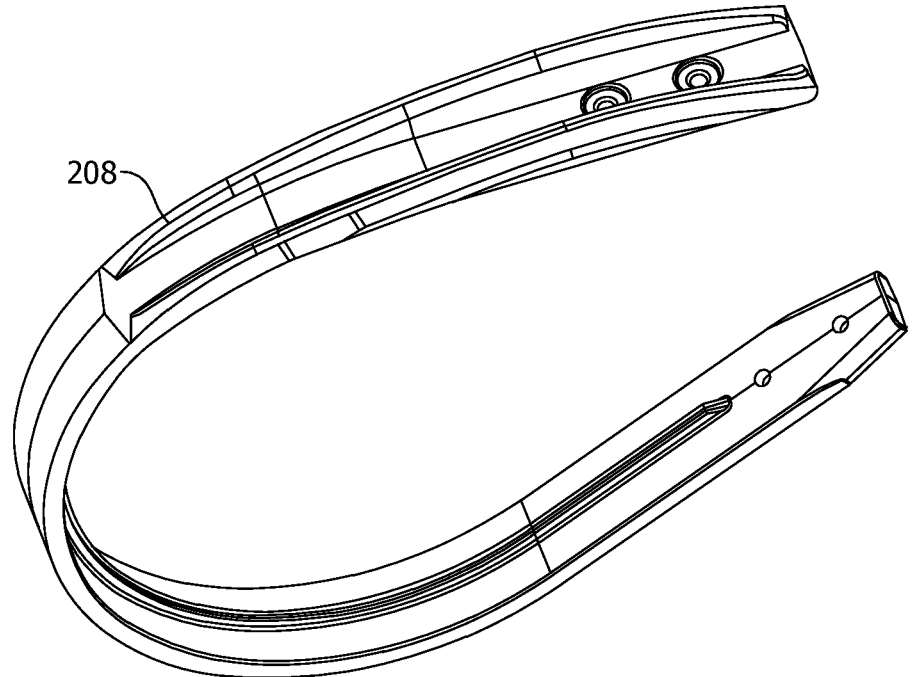
FIG. 9 is a perspective view of an embodiment of a stripper band of the crop pickup device shown in FIG. 8A.
Figures 10A, 10B, 10C, 10D, 10E, 10F:
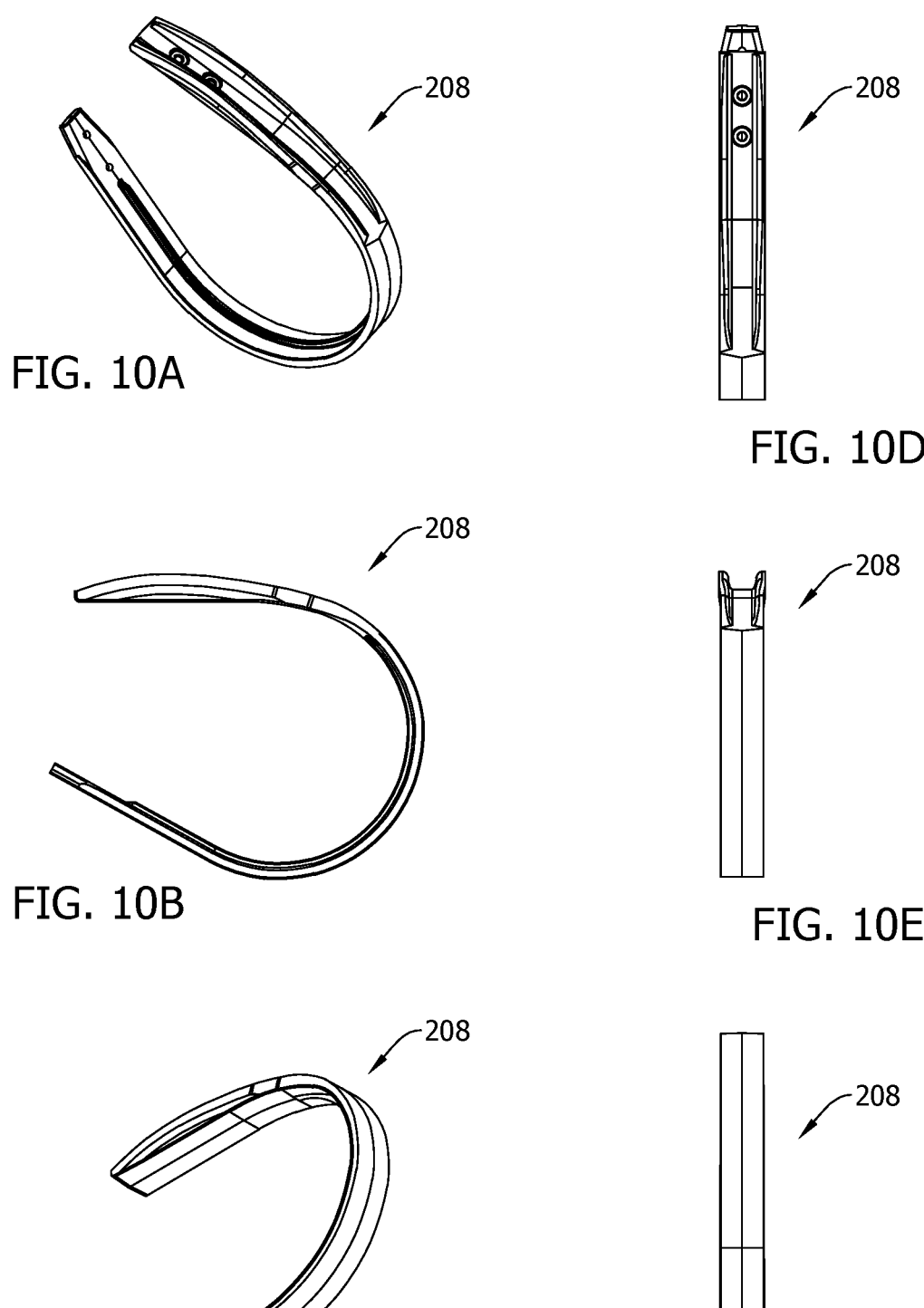
FIG. 10A is a perspective view of the embodiment of the stripper band shown in FIG. 9.
FIG. 10B is a side view of the embodiment of the stripper band shown in FIG. 9.
FIG. 10C is a perspective view of the embodiment of the stripper band shown in FIG. 9.
FIG. 10D is a top view of the embodiment of the stripper band shown in FIG. 9.
FIG. 10E is a front view of the embodiment of the stripper band shown in FIG. 9.
FIG. 10F is a bottom view of the embodiment of the stripper band shown in FIG. 9.

FIGS. 8A-8C show a configuration of the crop pickup device 200 of the present disclosure. In the example embodiment, the outer profile of the stripper bands 208 varies around an axis of rotation $A_{200}$ relative to the circumferential path of tines 202 when viewed from the side, as shown in FIG. 8A. In general, the stripper bands 208 have a U-shape, horseshoe shape, or tear drop shape when viewed from the side and may have an open portion 217. The open portion 217 may be utilized to facilitate mounting (fastening) the stripper bands 208 to the pickup frame 45 of the crop pickup device 200. The outer profile of the stripper bands 208 may vary depending on the intended purpose of the pickup tines 202 in a specific portion (e.g., a "zone") defined around the circumferential path.

For example, relative to the direction of rotation R of the pickup tines 202 and starting at the open portion 217 of the stripper band 208, the pickup tines 202 pass through the pickup frame 45 and may not interact with the stripper band 208 in this portion of the circumferential path. As the pickup reel 204 rotates in the direction of rotation R, the pickup tines 202 enters an emergent zone, where the pickup tines pass though the outer profile of the stripper band 208 and emerge in preparation for engaging the crop material. While the pickup tines 202 are not intended to contact the crop material in the emergent zone, contact with the crop material may occur. In the emergent zone, the stripper band 208 may have a flat or straight outer profile.

As the pickup tines 202 continue to rotate in the direction of rotation R, the pickup tines 202 enter an engagement zone, where the pickup tines 202 engage and convey the crop material toward the bale formation chamber 30 (generally in an upward and rearward path). In the engagement zone, the stripper band 208 may have a semi-circular outer profile with a consistent radius (e.g., an engagement zone radius).

In the example embodiment, the axis of rotation $A_{200}$ of the pickup tines 202 may be about coaxial with at least a portion of the radial center of the engagement zone. The engagement zone may begin at the point where the outer profile of the stripper band 208 in the emergent zone (generally a straight profile) transitions to the radiused outer profile of the stripper band 208. For example, the engagement zone may begin where the pickup tines 202 begin to engage the crop material as the round baler 10 passes through a field. The start of the engagement zone may vary depending on conditions of the field and/or the round baler 10, such as, but not limited to, a crop type, a stubble height, a height setting of the crop pickup device 200, and one or more ground conditions. For example, the pickup tines 202 engage, lift, and convey the crop as the pickup tines 202 pass between the positions indicated by "102B" and "102T" in FIG. 8A, which is referred to as the crop engagement zone. Position 202B is generally the position around the axis of rotation $A_{100}$ at which the pickup tines 102 begin to engage crop material for lifting and conveying the crop material from the ground toward the bale formation chamber 30.

As the pickup tines 202 continue to rotate in the direction of rotation R, the pickup tines 202 enter a release zone, where the crop material is released from the pickup tines 202. The engagement zone may end and the release zone may begin where the outer profile of the stripper band 208 transitions from the engagement zone radius to a release zone radius. In the example embodiment, the release zone radius is different from the engagement zone radius. In some embodiments, the release zone radius may vary throughout the release zone. The release zone may end where the tip of the pickup tines 202 pass through the outer profile of the stripper band 208 (thereby entering the open portion 217 of the stripper band 208).

The outer profile of the stripper band 208 is different in the release zone and the engagement zone. In the engagement zone, the outer profile of the stripper band 208 is shaped to facilitate conveyance of the crop material by the pickup tines 202, primarily via a carry angle that is relatively consistent through the engagement zone. In some embodiments, the carry angle may be between 100° and 140°. For example, the carry angle may be about 120°. In the release zone, the outer profile of the band is shaped to facilitate release of the crop material from the pickup tines 202 as the rotation of the pickup reel 204 causes the pickup tines 202 to pass through the outer profile of the stripper band 208, primarily via a minimum carry angle. In some embodiments, the minimum carry angle may be greater than 60° or even greater than 70° (e.g., from 60° to 80° or from 70° to 80° or about 75°). In other embodiments, the minimum carry angle may be about 75°. By maintaining the minimum carry angle in the release zone, the potential for the pickup tines 102 to carry the crop material past the stripper bands 208 is reduced.

In the example embodiment, the shape of the outer profile of the stripper bands 208 is different in the release zone and the engagement zone, as shown in FIG. 8A. The shape of the outer profile may be selected such that the carry angle is decreased in the release zone (e.g., the minimum carry angle) relative to the engagement zone. For example, each stripper band 108 may include upward projecting sidewalls in the release zone which create an outer profile (when viewed from the side) that allow the pickup tines 202 to convey the crop material toward the bale formation chamber 30 as the pickup tines 202 release the crop material while maintaining the minimum carry angle while the pickup tines 202 pass into the open portion 217 of the stripper bands 208.

The stripper bands 208 may have a variable width between the engagement zone and the release zone, as shown in FIGS. 8B and 8C. In some embodiments, only one of these elements is changed (e.g., only the width of the stripper bands 208 changes between the engagement zone and the release zone with the minimum carry angle being unchanged relative to the prior art, or only the minimum carry angle changes relative to the prior art with the width being the same across the length of the stripper band 208 from the engagement zone to the release zone). In other embodiments, both of these elements may be changed (e.g., both the width and the minimum carry angle change).

In some embodiments, the stripper bands 208 of the crop pickup 200 may be made of injection molded plastic (i.e., a monolithic component). In the example embodiment, the cross-sectional shape of the stripper bands 208 varies along its length. The cross-sectional shape of the stripper bands 208 near the top of the engagement zone along line 8B-8B of FIG. 8A is shown in FIG. 8B. At this position along line 8B-8B, the stripper bands 208 have a first width $W_1$ which provides a gap $G_1$ between the adjacent stripper bands 208 through which the pickup tines 202 pass. FIGS. 8B and 8C show configurations including inconsistent clearance between the pickup tines 102 and the stripper bands 208. For example, as shown in FIG. 8B, gap $G_2$ may not equal gap $G_3$, where gap $G_2$ is the gap between the edge of a first pickup tine 102 and the edge of a first adjacent stripper band 208, and gap $G_3$ is a gap between the edge of the first pickup tine 102 and the edge of a second adjacent stripper band 208.

The cross-sectional shape of the stripper bands 208 along the release zone at line 8C-8C of FIG. 8A is shown in FIG.

8C. In the release zone, the stripper bands 208 have a second width $W_2$ which provides a gap $G_4$ through which the pickup tines 202 pass. The gap $G_4$ is less than the gap $G_1$ to facilitate reducing the potential for the crop material to be pulled past the stripper bands 208 as the pickup tines 202 pass through the outer profile of the stripper bands 208 in the release zone. Stated differently, the second width $W_2$ of the pickup tines 202 in the release zone is greater than the first width $W_1$ of the pickup tines 202 in the engagement zone. By reducing the gap in the release zone, the clearance between the pickup tines 202 and the adjacent stripper bands 208 (represented by $G_5$ and $G_6$, shown in FIG. 8C) is reduced to facilitate reducing the amount of the crop material that is pulled within the stripper band 208. The gaps $G_5$ and $G_6$ are less than the gaps $G_2$ and $G_3$. In some embodiments, the gaps $G_5$ and/or $G_6$ may be zero, such that the pickup tine 202 contact or rub against the adjacent stripper band 208. By maintaining a larger clearance in the engagement zone, the potential for contact between the pickup tines 202 and the stripper bands 208 is reduced.

For example, the stripper bands 208 may be wider in the release zone as compared to the engagement zone (e.g., the first width $W_1$ being greater than the second width $W_2$). In some embodiments, the stripper bands 208 may be about 0.15 inches wider in the release zone as compared to the engagement zone, such as, but not limited to, a 0.15 inch difference between the first width $W_1$ of 2 inches and the second width $W_2$ of 2.15 inches.

Additionally, for example, a tine diameter of the pickup tines 202 (e.g., a tine thickness) may be about 0.375 inches. In some embodiments, the cumulative gap $G_1$ (e.g., including gap $G_2$, gap $G_3$, and the tine diameter of the pickup tine 202) in the engagement zone may be about 0.57 inches. The remaining 0.195 inches of cumulative gap $G_1$ may be split evenly between gap $G_2$ and gap $G_3$, with each of gap $G_2$ and gap $G_3$ being approximately 0.1 inches. In other embodiments, the cumulative gap $G_4$ (e.g., including gap $G_5$, gap $G_6$, and the tine diameter of the pickup tine 202) in the release zone may be about 0.42 inches. The remaining 0.045 inches of cumulative gap $G_4$ may be split evenly between gap $G_5$ and gap $G_6$, with each of gap $G_5$ and gap $G_6$ being approximately 0.02 inches.

Thereby, for example, the clearance between the pickup tines 202 and the adjacent stripper bands 208 may vary by as much as 80% from the engagement zone to the release zone. In some embodiments, the clearance between the pickup tines 202 and the adjacent stripper bands 208 may be reduced by about 35% to 64% from the engagement zone to the release zone. In other embodiments, the clearance between the pickup tines 202 and the adjacent stripper bands 208 may be reduced by about 65% to 94% from the engagement zone to the release zone. In still other embodiments, the clearance between the pickup tines 202 and the adjacent stripper bands 208 may be reduced by about 95% to 100% from the engagement zone to the release zone.

FIGS. 9 and 10A-10F are views of the stripper band 208 to be used with the crop pickup device 200.

Figure 11:
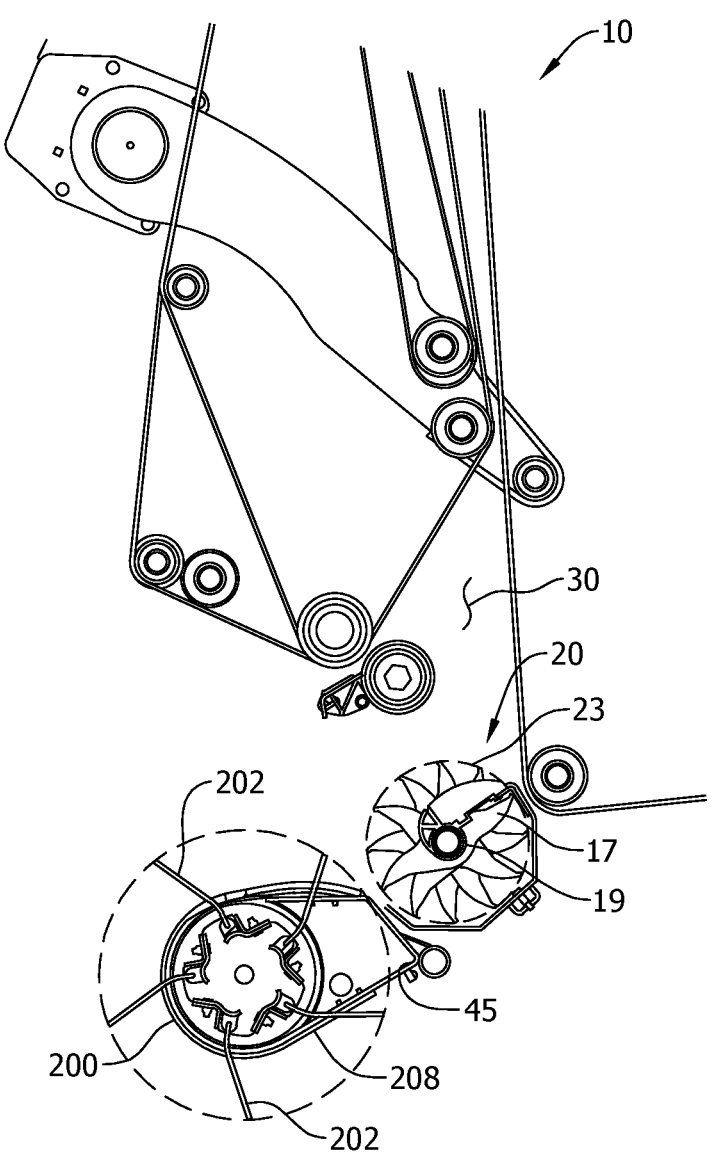
FIG. 11 is a side cross-section view of the crop pickup device shown in FIG. 8A.

FIG. 11 is a side cross-sectional view of the crop pickup device 200. The outer tips of the teeth 17 of the rotor device 20 define a circumferential path of travel 23 of the teeth 17. The path of travel 23 is adjacent the release zone (shown in FIG. 8A) of the crop pickup device 200 to convey the crop material upwards and away from the crop pickup device 200 towards the bale formation chamber 30.

Figure 12:
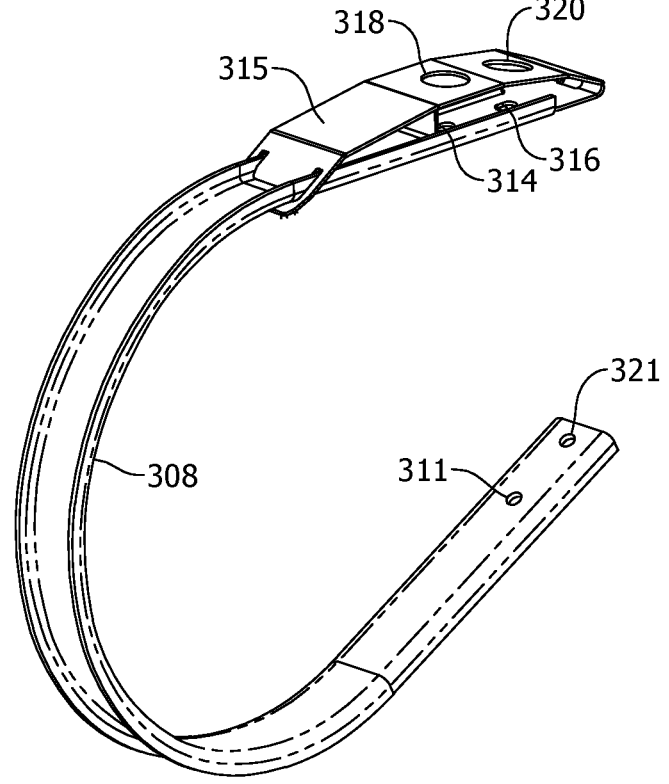
FIG. 12 is a perspective view of another embodiment of a stripper band and a clip for use with the crop pickup device shown in FIG. 8A.

FIG. 12 is a perspective view of an embodiment to a stripper band 308 to be used with the crop pickup device 200 and a clip 315. The clip 315 is connected to the stripper band 308. The stripper band 308 may have a consistent cross-sectional shape from one end to the other. The clip 315 may have a width $W_{315}$ greater than a width $W_{308}$ of the stripper band 308 to decrease the gap $G_4$ and the clearance of the pickup tines 202 in the release zone. In some embodiments, the clip 315 may taper to a greater width. In the example embodiment, the stripper band 308 includes upper stripper band apertures 314, 316 and lower stripper band apertures 311, 321 for inserting fasteners to connect the stripper band 308 to the pickup frame 45. The clip 315 also includes clip apertures 318, 320 that are co-axial with upper band apertures 314, 316 to connect the clip 315 and the stripper band 308 together to the pickup frame 45.

Figure 13:
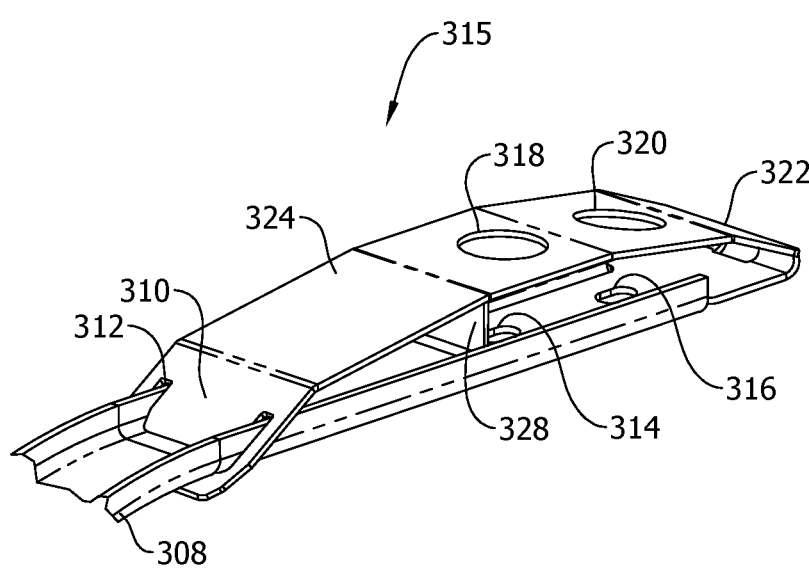
FIG. 13 is a detailed perspective view of the stripper band and the clip shown in FIG. 12.

FIG. 13 is a detailed perspective view of the stripper band 308 and the clip 315. The clip 315 may be made from a plate that is bent in several places to form a closed profile. The clip 315 may be welded at an end 328 that has been folded back into contact with the middle portion of the plate. The clip apertures 318, 320 in the plate are intended to be coaxial with the upper band apertures 314, 316. The clip 315 may be placed onto the stripper band 308 by sliding the stripper band 308 through a slot 312 formed in the front face 310 of the clip 315. A fastener may be inserted through the upper stripper band apertures 314, 316 and the clip apertures 318, 320 to secure the clip 315 and the stripper band 308 to the pickup frame 45. In some embodiments, the clip 315 may be configured to retrofit on the prior art stripper bands to produce a stripper band outer profile similar to the outer profile of stripper bands 208, thereby creating a release zone minimum carry angle that matches the minimum carry angle of the stripper bands 208. Similarly, the clip 315 may change the gap from the engagement zone to the release zone to match the tine gap reduction described in relation to stripper bands 208.

In some embodiments, the clip 315 may be of sufficient length to span the entirety of the release zone of the crop pickup device 200 (shown in FIG. 8A). The clip 315 includes upper clip surfaces 322, 324 that change the carry angle of the pickup tines 202 in the release zone (e.g., the minimum carry angle being at least 70°) compared to the stripper band 308 without the clip 315. For example, the intent of the clip 315 is to create an assembly with the stripper band 308 in which the outer profile of the assembled stripper band 308 and clip 315 creates the minimum carry angle that may be greater than 60° or even greater than 70° (e.g., from 60° to 80° or from 70° to 80° or about 75°) within the release zone.

Figure 14:
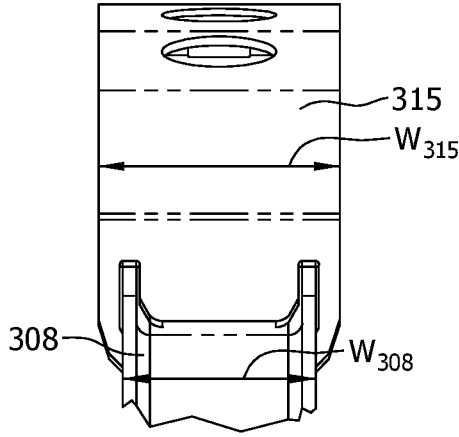
FIG. 14 is a detailed front view of the stripper band and the clip shown in FIG. 12.

FIG. 14 is a detailed front view of the stripper band 308 and the clip 315. The width $W_{315}$ of the clip 315 is greater than the width $W_{308}$ of the stripper band 308. The increased width of the clip 315 reduces the clearance of the tines in the release zone.

Figure 15:
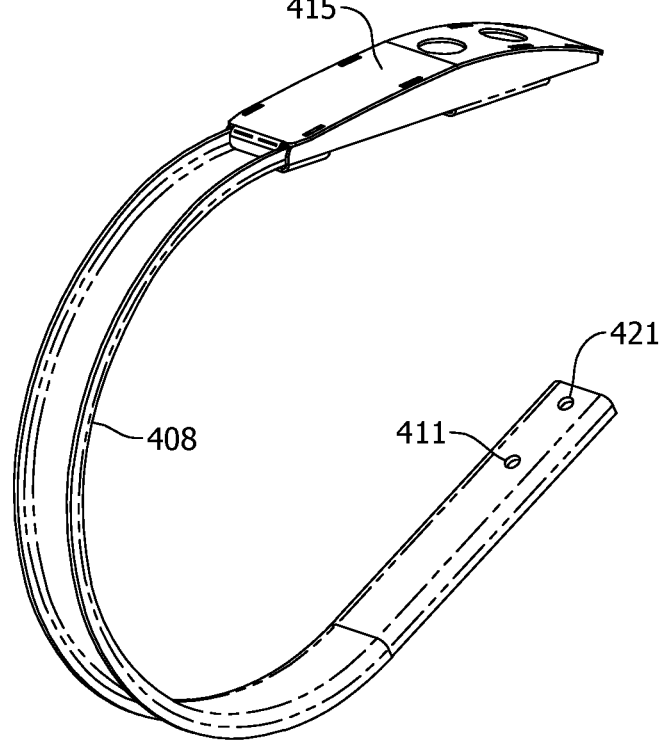
FIG. 15 is a perspective view of a further embodiment of a stripper band and a clip for use with the crop pickup device shown in FIG. 8A.
Figure 16:
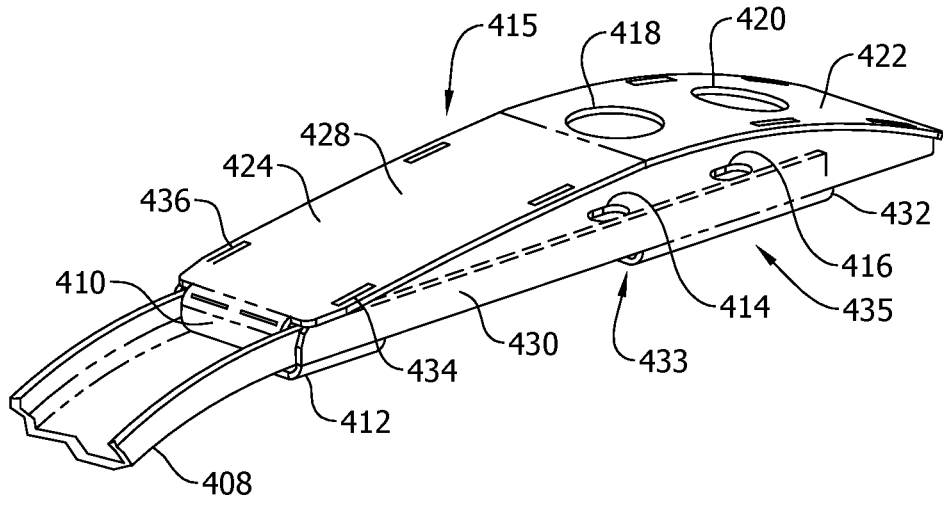
FIG. 16 is a detailed perspective view of the stripper band and the clip shown in FIG. 15.
Figure 17:
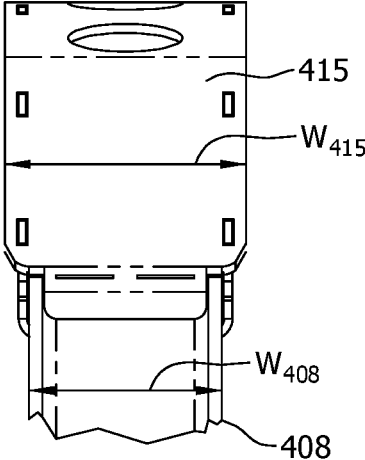
FIG. 17 is a detailed front view of the stripper band and the clip shown in FIG. 15.

FIGS. 15, 16, and 17 illustrate another embodiment of a stripper band 408 and a clip 415. The clip 415 is made from an upper plate 428 and a lower plate 430. The clip 415 is retained on the stripper band 408 by a front strap 412 and a rear strap 432. The front strap 412 is part of the lower plate 430 and fits underneath the stripper band 408. The rear strap 432 is part of the lower plate 430 and also fits underneath the stripper band 408.

A front tab 410 that is part of the upper plate 428 is opposed to the front strap 412. The upper plate 428 and the lower plate 430 are secured together by tabs 434 that are formed on the lower plate 430 that fit into slots 436 formed in the upper plate 428. The upper plate 428 and the lower plate 430 may be joined by welding.

The clip 415 is installed onto the stripper band 408 by slipping the front strap 412 underneath the band while the front tab 410 is above the stripper band 408. At the back of the clip, fasteners (not shown) are inserted through apertures 418, 420 that are coaxial with apertures 414, 416 of the stripper band 408. The fasteners pass through apertures 414, 416 of the stripper band 408, and through apertures 433, 435 formed in the rear strap 432 that is part of the lower plate 430.

In some embodiments, the clip 415 may be of sufficient length to span the entirety of the release zone of the crop pickup device 200 (shown in FIG. 8A). The clip 415 includes upper clip surfaces 422, 424 that change the carry angle of the pickup tines 202 in the release zone (e.g., the minimum carry angle being at least 70°) compared to the stripper band 408 without the clip 415. For example, the intent of the clip 415 is to create an assembly with the stripper band 408 in which the outer profile of the assembled stripper band 408 and clip 415 creates the minimum carry angle that may be greater than 60° or even greater than 70° (e.g., from 60° to 80° or from 70° to 80° or about 75°) within the release zone.

FIG. 17 is a detailed front view of the stripper band 408 and the clip 415. The width $W_{415}$ of the clip 415 is greater than the width $W_{408}$ of the stripper band 408. The increased width of the clip 415 reduces the clearance of the pickup tines 202 in the release zone. In some embodiments, the increased width of the clip 415 may reduce the clearance of the pickup tines 202 in the release zone by up to 80%.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing," and "having" are intended to be inclusive and mean that there may be additional elements other than the listed elements. The use of terms indicating a particular orientation (e.g., "top," "bottom," "side," etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. A round baler comprising:
   a bale formation chamber;
   a rotor device having a plurality of teeth connected to a rotor, the teeth having outer tips that define a circumferential path of travel of the rotor device; and
   a camless crop pickup device comprising a plurality of pickup tines connected to a rotating pickup reel and a plurality of stripper bands having an outer profile, wherein each of the plurality of pickup tines has a distal end defining a circumferential path of travel of the crop pickup device, each of the plurality of pickup tines passing through a gap formed between adjacent stripper bands, the crop pickup device having:

an engagement zone within which the plurality of pickup tines extend beyond the outer profile of the plurality of stripper bands by a first carry distance and at a first carry angle; and a release zone within which the plurality of stripper bands are shaped such that the pickup tines extend beyond the outer profile of the plurality of stripper bands by a second carry distance and at a second carry angle, the release zone extending from the engagement zone to a position at which each of the plurality of pickup tines pass through the outer profile of the stripper bands, wherein each of the plurality of stripper bands is a monolithic component, wherein each of the plurality of stripper bands has a first width in the engagement zone and wherein, in the release zone, each of the plurality of stripper bands includes a base and opposing sidewalls extending from the base, the sidewalls being angled upward and outward, towards the tines, from the base such that the stripper bands have a second width in the release zone that is greater than the first width in the engagement zone, and wherein the release zone is adjacent to the circumferential path of travel of the rotor device such that the rotor device and the pickup reel rotate and cooperate to convey crop material from the crop pickup device towards the bale formation chamber.

2. The round baler of claim 1, wherein the first carry distance is measured from the outer profile of the plurality of stripper bands to the distal end of the plurality of pickup tines within the engagement zone.

3. The round baler of claim 2, wherein the first carry distance is substantially uniform through the engagement zone.

4. The round baler of claim 1, wherein the second carry distance is measured from the outer profile of the plurality of stripper bands to the distal end of the plurality of pickup tines within the release zone, wherein the second carry distance is variable through the release zone.

5. The round baler of claim 1, wherein the first and second carry angles are measured between a longitudinal axis extending from the distal end of the plurality of pickup tines and a plane extending tangentially from the outer profile of the plurality of stripper bands at an overlap position where the plurality of pickup tines extend beyond the outer profile of the plurality of stripper bands.

6. The round baler of claim 5, wherein the first carry angle is substantially uniform through the engagement zone.

7. The round baler of claim 5, wherein the first carry angle is greater than the second carry angle.

8. The round baler of claim 1, wherein the gap formed between adjacent stripper bands comprises a first gap and a second gap, the first gap being between a first stripper band of the plurality of stripper bands and a pickup tine of the plurality of pickup tines, and the second gap being between a second stripper band of the plurality of stripper bands and the pickup tine, the first stripper band being adjacent to the second stripper band.

9. The round baler of claim 8, wherein the first gap is formed between the first stripper band and a first edge of the pickup tine.

10. The round baler of claim 9, wherein the second gap is formed between the second stripper band and a second edge of the pickup tine, the second edge of the pickup tine being opposite to the first edge, wherein at least one of the first gap and the second gap varies from the engagement zone to the release zone.

11. The round baler of claim 10, wherein at least one of the first gap and the second gap varies by up to 80% from the engagement zone to the release zone.

12. The round baler of claim 10, wherein at least one of the first gap and the second gap varies by about 35% to about 64% from the engagement zone to the release zone.

13. The round baler of claim 10, wherein at least one of the first gap and the second gap varies by about 65% to about 94% from the engagement zone to the release zone.

14. The round baler of claim 1, wherein the second width of the stripper bands in the release zone is constant.

15. The round baler of claim 1, wherein the first width of the stripper bands in the engagement zone is constant.

16. The round baler of claim 1, wherein in the release zone the tines do not contact the stripper bands.

17. A round baler comprising:

a bale formation chamber;

a rotor device having a plurality of teeth connected to a rotor, the teeth having outer tips that define a circumferential path of travel of the rotor device; and a crop pickup device comprising a plurality of pickup tines, having a constant radial length, connected to a pickup reel having a constant outer diameter about an axis of rotation and a plurality of stripper bands having an outer profile, wherein each of the plurality of pickup tines has a distal end defining a constant circumferential path of travel of the crop pickup device, each of the plurality of pickup tines passing through a gap formed between adjacent stripper bands, the crop pickup device having:

an engagement zone within which the plurality of pickup tines extend beyond the outer profile of the plurality of stripper bands by a first carry distance and at a first carry angle, wherein the stripper bands includes a radial curve in the engagement zone that is co-axial with the axis of rotation of the crop pickup device; and a release zone within which the plurality of stripper bands are shaped such that the pickup tines extend beyond the outer profile of the plurality of stripper bands by a second carry distance and at a second carry angle, the release zone extending from the engagement zone to a position at which each of the plurality of pickup tines pass through the outer profile of the stripper bands, wherein each of the plurality of stripper bands is a monolithic component, wherein each of the stripper bands has a first width in the engagement zone, and wherein, in the release zone, each of the plurality of stripper bands includes at least one upward and outward projecting sidewall such that the stripper bands have a second width in the release zone that is greater than the first width in the engagement zone; and wherein the release zone is adjacent to the circumferential path of travel of the rotor device such that the rotor device and the pickup reel rotate and cooperate to convey crop material from the crop pickup device towards the bale formation chamber.

* * * * *